United States Patent
Dosaki et al.

(10) Patent No.: US 9,944,159 B2
(45) Date of Patent: Apr. 17, 2018

(54) HOLDING STRUCTURE OF GLASS RUN FOR AUTOMOBILE

(71) Applicant: TOYODA GOSEI CO., LTD., Kiyosu-shi, Aichi-ken (JP)

(72) Inventors: Tomohiro Dosaki, Kiyosu (JP); Yoshinobu Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/260,384

(22) Filed: Sep. 9, 2016

(65) Prior Publication Data
US 2017/0087969 A1    Mar. 30, 2017

(30) Foreign Application Priority Data
Sep. 24, 2015   (JP) ................................. 2015-186362

(51) Int. Cl.
*B60J 10/76* (2016.01)
*B60J 10/16* (2016.01)
*B60J 10/79* (2016.01)

(52) U.S. Cl.
CPC .............. *B60J 10/76* (2016.02); *B60J 10/16* (2016.02); *B60J 10/79* (2016.02)

(58) Field of Classification Search
CPC .................................. B60J 10/76; B60J 10/79
USPC ........................................ 49/440, 441, 428
See application file for complete search history.

(56) References Cited

U.S. PATENT DOCUMENTS

| | | | | | |
|---|---|---|---|---|---|
| 4,490,942 | A | * | 1/1985 | Arnheim ................. | B60J 10/24 49/374 |
| 4,653,230 | A | * | 3/1987 | Seo ......................... | B60J 10/79 49/227 |
| 4,662,113 | A | * | 5/1987 | Weaver ............. | B29C 45/14377 264/252 |
| 4,823,511 | A | * | 4/1989 | Herliczek ................ | B60J 10/74 428/83 |
| 4,920,699 | A | * | 5/1990 | Nagata .................. | B60J 10/277 49/441 |
| 5,365,698 | A | * | 11/1994 | Nozaki .................... | B60J 10/30 49/441 |
| 5,613,325 | A | * | 3/1997 | Mariel ............ | B32B 17/10036 49/374 |
| 6,205,712 | B1 | * | 3/2001 | Ellis ........................ | B60J 10/79 49/377 |

(Continued)

FOREIGN PATENT DOCUMENTS

JP    2012-056536 A    3/2012

*Primary Examiner* — Gregory J Strimbu
*Assistant Examiner* — Marcus Menezes
(74) *Attorney, Agent, or Firm* — Posz Law Group, PLC

(57) ABSTRACT

A holding structure of a glass run for an automobile is capable of holding the glass run with a lower channel with excellent insertion workability to hold a door glass securely. In the holding structure of the glass run with the lower channel, the glass run has a first side wall, a second side wall, a third side wall and a fourth side wall, and has a generally rectangular cross section. One part of the side walls is composed of a material with rigidity higher than those of remaining parts of the side walls. A glass slider is attached to an end edge of the door glass below the belt line, and a tip end part of the glass slider, which is continuous with a main part of the glass slider via an opening part of the glass run, is held with the glass run.

7 Claims, 4 Drawing Sheets

(56) References Cited

U.S. PATENT DOCUMENTS

| | | | |
|---|---|---|---|
| 9,038,319 B2* | 5/2015 | Kuwabara | B60J 10/048 49/498.1 |
| 9,597,949 B2* | 3/2017 | Nojiri | B60J 10/76 |
| 2005/0003158 A1* | 1/2005 | Yamasa | B60J 10/16 428/143 |
| 2006/0021282 A1* | 2/2006 | Tamaoki | B60J 10/74 49/441 |
| 2006/0037249 A1* | 2/2006 | Kawamura | B60J 10/74 49/414 |
| 2017/0129318 A1* | 5/2017 | Uemura | B60J 10/76 |

* cited by examiner

HOLDING STRUCTURE OF GLASS RUN FOR AUTOMOBILE

CROSS-REFERENCE TO RELATED APPLICATION

This application is related to and claims priority from Japanese patent Application No. 2015-186362 incorporated herein by reference.

BACKGROUND OF THE INVENTION

1. Field of the Invention

The present invention relates to a holding structure of a glass run for an automobile, which is adapted to be attached to a lower channel mounted below a belt line of an automobile door for guiding a door glass as it is raised and lowered.

2. Description of Related Art

As shown in FIG. 1, a glass run 10 is attached to an inner periphery of a door frame 12 of an automobile door 14 for guiding a door glass 16 as it is raised and lowered. An entire part of the conventional glass run 10 is shown in FIG. 2, a cross-sectional view of the conventional glass run 10 attached on a rear side of the door frame 12 is shown in FIG. 3, and a cross-sectional view of another conventional glass run 20 attached between a door glass 16 and an auxiliary glass on a rear side thereof is shown in FIG. 4.

As shown in FIG. 3, the conventional glass run 10 has been attached within a channel 22 of the door frame 12 to guide the door glass 16 as it is raised and lowered, and provide a seal between the door glass 16 and the door frame 12. In addition, as shown in FIG. 2, the conventional glass run 10 includes an upper side portion 24 for attachment to an upper side of the door frame 12, a front vertical side portion 26 and a rear vertical side portion 28, which are formed into straight portions 30 by extrusion, and they are connected to each other via corner portions 32 formed by molding to conform to corner parts 34 of the door frame 12.

And, a glass run rear lower portion 36 held with the lower channel is provided below a belt line 38 of the automobile door 14. When the door glass 16 is lowered within the automobile door 14, the glass run rear lower part 36 guides the door glass 16 as it is raised and lowered. The glass run rear lower portion 36 is connected to the rear vertical side portion 28 via a rear vertical connection portion formed by molding.

On the other hand, a seal between the automobile door 14 and an automobile body is provided with a door weather strip (not shown) attached to a door panel and an outer periphery of the door frame 12, and/or an opening trim weather strip (not shown) attached to a flange provided in a door opening portion of the automobile body.

The rear vertical side portion 28 of the glass run 10, which is attached above the belt line 38 of the automobile door 14, includes an outer side wall 40, an inner side wall 42 and a bottom wall 44, and has a generally U-shaped cross section, as shown in FIG. 3. A first outer seal lip 46 is provided to extend from a tip end of the outer side wall 40 toward an interior of a main body of the glass run 10, which has a generally U-shaped cross section. And a second outer seal lip 48 is provided to extend from the tip end of the outer side wall 40 in an extension direction of the outer side wall 40 so as to cover an end edge of the door glass 16.

A first inner seal lip 50 and a second inner seal lip 52 are provided in the inner side wall 42 so as to extend from the vicinity of a tip end of the inner side wall 42 toward the interior of the main body of the glass run 10, which has a generally U-shaped cross section.

The outer side wall 40, the inner side wall 42 and the bottom wall 44 of the main body of the glass run 10 are inserted into the channel 22 provided in the door frame 12, and at least one part of an exterior surface of each of the outer side wall 40, the inner side wall 42 and the bottom wall 44 is pressed against interior surfaces of the channel 22 to hold the glass run 10.

In order to engage the glass run 10 with the channel 22, and hold the glass run 10 within the channel 22 upon attaching of the glass run 10 within the channel 22, an inner holding lip 54 and an outer holding lip 56 are respectively provided in the inner side wall 42 and the outer side wall 40 of the rear vertical side portion 28 of the glass run 10.

A glass slider 58 is attached to an interior surface of an end edge of the door glass 16 to slide within an interior space of the main body of the glass run 10, and both surfaces of the end edge of the door glass 16 are sealed with the first outer seal lip 46, the second outer seal lip 48 and the first inner seal lip 50 (see Japanese patent application laid-open No. 2006-56472, for example).

When the glass slider 58 of the door glass 16 slides within the interior space of the glass run 10 below the belt line 38 of the automobile door 14, the inner side wall 42, the second inner seal lip 52 and the inner holding lip 54, each being composed of a hard material, exhibit an improved holding force, but the first outer seal lip 46 and the first inner seal lip 50, each being composed of a soft material, exhibit a weak holding force against the glass slider 58. The glass run 10 is inserted into and held with the channel 22 of the door frame 12, which has a U-shaped cross section, so that when the glass run 10 is held with a lower channel 60 below the belt line 38 of the automobile door 14, the holding force against the glass run 10 is weak.

And, in another conventional holding structure shown in FIG. 4, a channel 64 provided above the belt line 38 of the automobile door 14, includes a first wall 66, a second wall 68, a third wall 70 and a fourth wall 72, and has a rectangular cross section. And an opening part 74 is defined between the first wall 66 and the fourth wall 72. A glass run 20 including a first side wall 76, a second side wall 78, a third side wall 80 and a fourth side wall 82 has been attached within the channel 64 (see Japanese patent application laid-open No. 2012-56536, for example).

In this case, a glass slider 84 having a key-shaped bending cross section has been attached to an interior surface of an end edge of the door glass 16 to slide within an interior space of a main body of the glass run 20, which has a generally U-shaped cross section, and the door glass 16 has been sealed with outer seal lips 86 and 88 on surfaces on opposite sides of the glass slider 84.

However, in the channel 64 of this case, the opening part 74 is defined between the first wall 66 and the fourth wall 72 so that when the glass run 20 is attached, the opening part 74 is provided in only one part of one side of the channel 64 so as to become narrow, whereby it has been difficult to insert the glass run 20 from the narrow opening part 74. Under such circumstance, the glass run 20 has been assembled by inserting the same from an end of the channel 64 in a longitudinal direction thereof.

A lower channel below the belt line 38 of the automobile door 14 may be bent slightly to conform to the configuration of the automobile door 14. In this case, during inserting of the glass run 20 into the lower channel, an insertion resistance increases so that the glass run 20 may deform to lower insertion workability.

SUMMARY OF THE INVENTION

It is an object of the present invention to provide a holding structure of a glass run for an automobile, which is capable of holding the glass run with a lower channel with excellent insertion workability to securely hold a door glass.

In order to achieve the above-described object, according to a first aspect of the present invention, in a holding structure of a glass run for an automobile, which is adapted to be attached to a lower channel provided below a belt line of an automobile door for guiding a door glass as it is raised and lowered, the glass run has a first side wall, a second side wall, a third side wall and a fourth side wall, and has a generally rectangular cross section. The first side wall, the second side wall, the third side wall and the fourth side wall are respectively formed to have a plate-shaped configuration, and at least one part of the first side wall, the second side wall, the third side wall and the fourth side wall is composed of a material with rigidity higher than those of remaining parts of the side walls. An opening part is defined between a tip end of the first side wall and a tip end of the fourth side wall. The lower channel has a first wall, a second wall, a third wall and a fourth wall and has a generally rectangular cross section, and an opening part of the lower channel is defined between a tip end of the first wall and the fourth wall of the lower channel. A glass slider is attached to each tip end of longitudinal side parts of a front side edge and a rear side edge of the door glass, and a tip end part of the glass slider, which is continuous with a main part of the glass slider via the opening part of the glass run, and is located within the glass run, is held with the glass run. And the first side wall, the second side wall, the third side wall and the fourth side wall of the glass run are held with the first wall, the second wall, the third wall and the fourth wall of the lower channel.

With the arrangement of the first aspect of the present invention, in the holding structure of a glass run for an automobile, which is adapted to be attached to a lower channel provided below a belt line of an automobile door for guiding a door glass as it is raised and lowered, the glass run has a first side wall, a second side wall, a third side wall and a fourth side wall, and has a generally rectangular cross section. Therefore, the glass run can be securely held in an interior space of the lower channel, and the door glass or the glass slider attached to the door glass is held in an interior space of a main body of the glass run to guide the glass run as it is raised or lowered.

The first side wall, the second side wall, the third side wall and the fourth side wall are respectively formed to have a plate-shaped configuration, and at least one part of the first side wall, the second side wall, the third side wall and the fourth side wall is composed of a material with rigidity higher than those of remaining parts of the side walls. Therefore, the rigidity of the glass run is improved so that when the glass run is inserted into the lower channel, deformations of the glass run are prevented, and even when an insertion resistance is raised, an insertion force is readily transmitted in a longitudinal direction, thereby improving insertion workability.

An opening part is defined between a tip end of the first side wall and a tip end of the fourth side wall. Therefore, the tip end part of the glass slider, which is located in the interior space of a main body of the glass run, is connected with a main body of the glass slider, which is attached to the door glass and is located in the opening part of the glass run, thereby holding the glass slider with the main body of the glass run, guiding the door glass as it is raised and lowered, and providing a seal between the glass slider and the glass run.

The lower channel has a first wall, a second wall, a third wall and a fourth wall, and has a generally rectangular cross section. Therefore, the glass run can be held with four walls of the lower channel so that when the door glass is raised and lowered, or vibrates, the door glass can be securely held within the lower channel.

An opening part of the lower channel is defined between a tip end of the first wall and the fourth wall of the lower channel. Therefore, the opening part of the glass run is held with the opening part of the lower channel so that when the glass slider slides the opening part of the glass run, deformations of the opening part of the glass run can be prevented.

The glass slider is attached to each tip end of longitudinal side parts of a front side edge and a rear side edge of the door glass, and a tip end part of the glass slider, which is continuous with a main part of the glass slider via the opening part of the glass run, and is located within the glass run, is held with the glass run. By holding the glass slider within the glass run in an interior space of the automobile door, the raising and lowering of the glass slider can be made smooth while preventing rattling of the door glass.

The first side wall, the second side wall, the third side wall and the fourth side wall of the glass run are held with the first wall, the second wall, the third wall and the fourth wall of the lower channel. Therefore, the four walls of the lower channel, which are formed to have a generally rectangular cross section, hold the glass run including four side walls to stably hold the glass run within the lower channel.

According to a second aspect of the present invention, the first side wall of the glass run is composed of a material with rigidity higher than those of remaining parts of the side walls.

With the arrangement of the second aspect of the present invention, the first side wall of the glass run is composed of a material with rigidity higher than those of the remaining parts of the side walls so that when the glass run is inserted from the tip end of the lower channel, the glass run is prevented from deforming, and the insertion workability is improved. In addition, the first side wall is difficult to be deformed so that the first seal lip and the second seal lip stably contact the glass slider, thereby improving the sealing properties between the glass slider and the glass run.

According to a third aspect of the present invention, the third side wall of the glass run is composed of a material with rigidity higher than those of remaining parts of the side walls.

With the arrangement of the third aspect of the present invention, the third side wall of the glass run is composed of a material with rigidity higher than those of the remaining parts of the side walls so that when the glass run is inserted from the tip end of the lower channel, the third side wall located in a central part of the glass run is prevented from deforming so as to prevent deformations of an entire part of the glass run, and improve the insertion workability. In addition, the third side wall exhibits higher rigidity so that a holding lip of the fourth side wall can be prevented from dropping from a bending part of the fourth wall of the lower channel.

According to a fourth aspect of the present invention, a connection part between the first side wall and the second side wall of the glass run is composed of a material with rigidity higher than those of remaining parts of the side walls.

With the arrangement of the fourth aspect of the present invention, the connection part between the first side wall and the second side wall of the glass run is composed of a material with rigidity higher than those of the remaining parts of the side walls so that when the glass run is inserted from the tip end of the lower channel, the glass run is prevented from deforming, and the insertion workability can be improved. In addition, the first side wall and the second side wall are prevented from deforming so that the first seal lip and the second seal lip securely contact the glass slider to improve the sealing properties between the glass slider and the glass run.

According to a fifth aspect of the present invention, a recess is defined in an interior surface of each of a connection part between the second side wall and the third side wall and a connection part between the third side wall and the fourth side wall of the glass run.

With the arrangement of the fifth aspect of the present invention, a recess is defined in an interior surface of each of a connection part between the second side wall and the third side wall and a connection part between the third side wall and the fourth side wall of the glass run. Therefore, when the glass run is produced, the connection part between the second side wall and the third side wall is opened to define an obtuse angle, and the connection part between the third side wall and the fourth side wall is also opened to define an obtuse angle. The glass run is inserted into the lower channel by narrowing the obtuse-angled parts. Since the connection part between the second side wall and the third side wall and the connection part between the third side wall and the fourth side wall can be readily bent, the insertion workability is improved.

According to a sixth aspect of the present invention, a first seal lip is formed to extend from the tip end of the first side wall obliquely outwardly of the first side wall toward the second side wall, whereas a second seal lip is formed to extend from the tip end of the first side wall obliquely inwardly of the first side wall toward the second side wall. The glass slider has a U-shaped cross section, which defines a glass slider recessed part on a side facing the tip end of the first side wall, and the first seal lip and the second seal lip contact the glass slider recessed part to guide the glass slider.

With the arrangement of the sixth aspect of the present invention, the first seal lip is formed to extend from the tip end of the first side wall obliquely outwardly of the first side wall toward the second side wall, whereas the second seal lip is formed to extend from the tip end of the first side wall obliquely inwardly of the first side wall toward the second side wall. Therefore, when the first seal lip and the second seal lip contact the glass slider, the first seal lip and the second seal lip can flexibly bend to provide a seal against the glass slider.

The glass slider has a U-shaped cross section, which defines a glass slider recessed part on a side facing the tip end of the first side wall, and the first seal lip and the second seal lip contact the glass slider recessed part to guide the glass slider. Therefore, when the door glass is raised and lowered, the first seal lip and the second seal lip contact the glass slider recessed part to stably hold the glass slider recessed part and smoothly guide the door glass as it is raised and the lowered.

According to a seventh aspect of the present invention, a third seal lip is formed to extend from a tip end of the fourth side wall obliquely inwardly of the fourth side wall toward the third side wall to locate the tip end part of the glass slider within the glass run, and hold the glass slider such that the third seal lip contacts a surface of the glass slider, which faces the fourth side wall.

With the arrangement of the seventh aspect of the present invention, the third seal lip is formed to extend from a tip end of the fourth side wall obliquely inwardly of the fourth side wall toward the third side wall to locate the tip end part of the glass slider within the glass run, and hold the glass slider such that the third seal lip contacts a surface of the glass slider, which faces the fourth side wall. Therefore, the third seal lip prevents the movement of the glass slider located within the main body of the glass run toward the fourth side wall, thereby improving the sealing properties between the glass run and the glass slider.

According to an eighth aspect of the present invention, the material with higher rigidity exhibits a durometer hardness D (HDD) ranging from 30 to 80.

With the arrangement of the eighth aspect of the present invention, the material with higher rigidity exhibits an HDD hardness ranging from 30 to 80 so that when the glass run is inserted into the lower channel, deformations of the glass run are prevented while maintaining the rigidity of the glass run, thereby improving the insertion workability. When the HDD hardness is less than 30, the rigidity of the glass run cannot be maintained to deteriorate the insertion workability into the lower channel, whereas when the HDD hardness exceeds 80, the rigidity of the glass run becomes too great to increase the insertion load during the insertion work of the glass run into the lower channel.

Since at least one part of the first side wall, the second side wall, the third side wall and the fourth side wall of the glass run is composed of a material with rigidity higher than those of the remaining parts thereof so that when the glass run is inserted into the lower channel, any deformation of the glass run can be prevented to improve the insertion workability.

The lower channel has a first wall, a second wall, a third wall and a fourth wall, and has a generally rectangular cross section. With this arrangement, the glass run can be held with these four walls, and when the door glass is raised and lowered, or vibrates, the door glass can be securely held within the lower channel.

A glass slider is attached to a tip end of the door glass below the belt line of the automobile door, and a tip end part of the glass slider is inserted into the glass run from the opening part of the glass run to hold the glass slider. Therefore, by holding the glass slider with the glass run within the automobile door, the glass run is held to smoothly guide the door glass as it is raised and lowered.

Other objects, features, and characteristics of the present invention will become apparent upon the consideration of the following description and the appended claims with reference to the accompanying drawings, all of which form a part of this specification.

DETAILED DESCRIPTION OF THE PREFERRED EMBODIMENTS

An embodiment of the present invention will be explained with reference to FIG. 1, FIG. 2 and FIG. 5.

Figure 1:
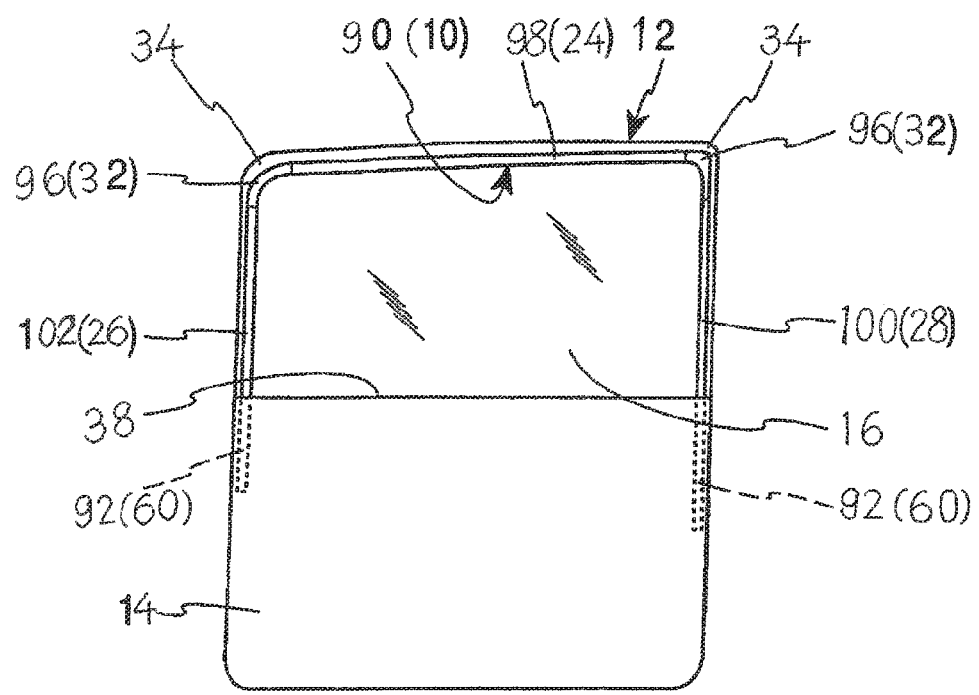
FIG. 1 is a front view of an automobile door.
Figure 2:
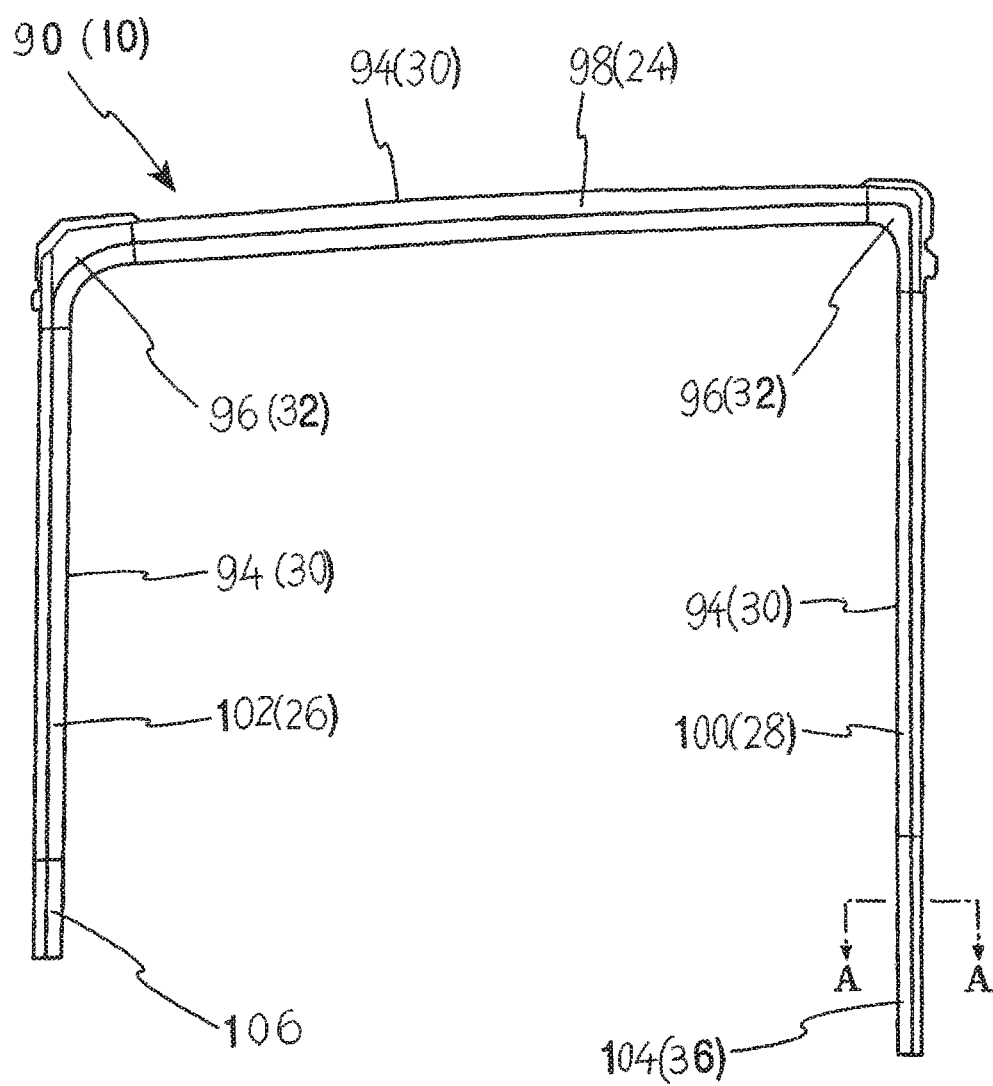
FIG. 2 is a front view of a glass run in an embodiment of the present invention.
Figure 3:
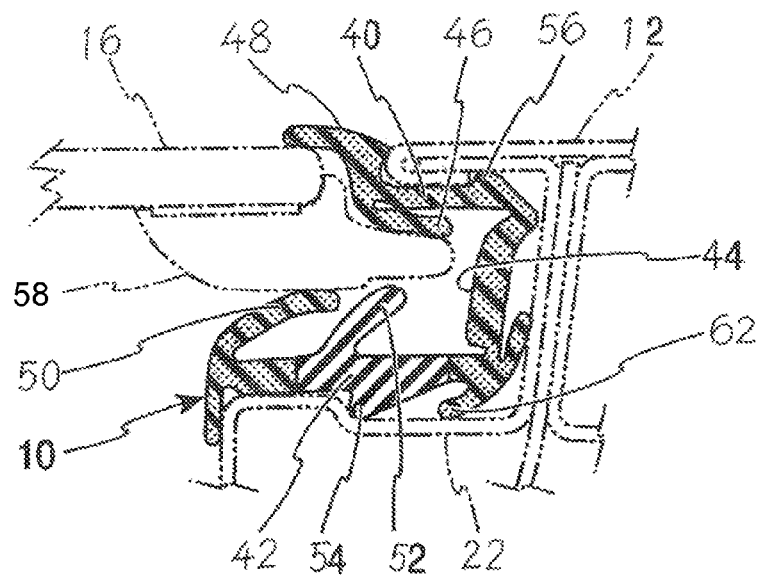
FIG. 3 is a cross-sectional view of a conventional glass run attached to a vertical side of a door frame.
Figure 4:
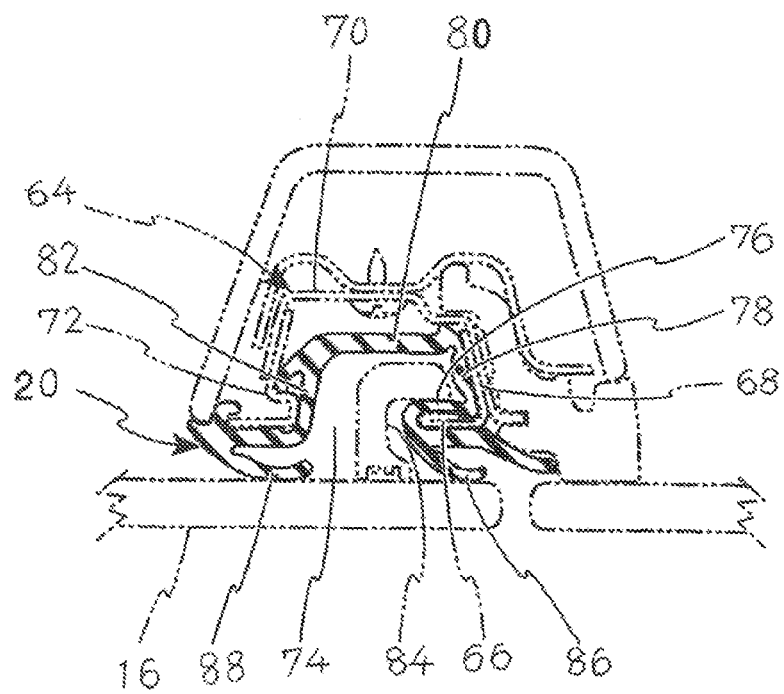
FIG. 4 a cross-sectional view of another conventional glass run attached to a vertical side of a door frame.

FIG. 1 is a front view of a rear door 14 of an automobile, and FIG. 2 is a front view of a glass run 90 for the rear door 14, which is attached to a door frame 12 of the rear door 14. As shown in FIG. 1, the door frame 12 is provided in an upper part of the rear door 14, and a door glass 16 is attached thereto so as to be raised and lowered. The glass run 90 is attached to an inner periphery of the door frame 12 to guide the door glass 16 as it is raised and lowered, and provide a seal between the door glass 16 and the door frame 12.

Lower channels 92 are provided within the rear door 14 below the belt line 38 thereof, and when the door glass 16 is lowered into the rear door 14, the lower channels 92 guide the door glass 16.

As shown in FIG. 2, the glass run 90 attached to the door frame 12 includes straight portions 94, each being entirely formed by extrusion, and corner portions 96, each being attached to a corner part 34 of the door frame 12 to connect the straight portions 94 to each other, and being formed by molding.

The straight portions 94 include an upper side portion 98 for attachment to an upper side of the door frame 12, a rear vertical side portion 100 for attachment to a rear vertical side of the door frame 12 and a front vertical side portion 102 for attachment to a division sash defining a front vertical side of the door frame 12.

As shown in FIG. 2, portions of the glass run 90, which are attached to the lower channels 92 include a rear lower glass run 104 for attachment below the rear vertical side of the door frame 12, and a front lower glass run 106 for attachment below the front vertical side of the door frame 12. The rear lower glass run 104 contacts the rear vertical side portion 100 of the glass run 90, whereas the front lower glass run 106 contacts the front vertical side portion 102 of the glass run 90.

Hereinafter, the rear lower glass run 104 of the glass run 90, which is attached to the lower channel 92 of the rear door 14, the lower channel 92 to which the rear lower glass run 104 is attached, and a tip end of the door glass 16, which is held with the rear lower glass run 104, will be explained based on FIG. 5.

First, the lower channel 92 along with the tip end of the door glass 16 will be explained, and the rear lower glass run 104 will be explained later.

Figure 5:
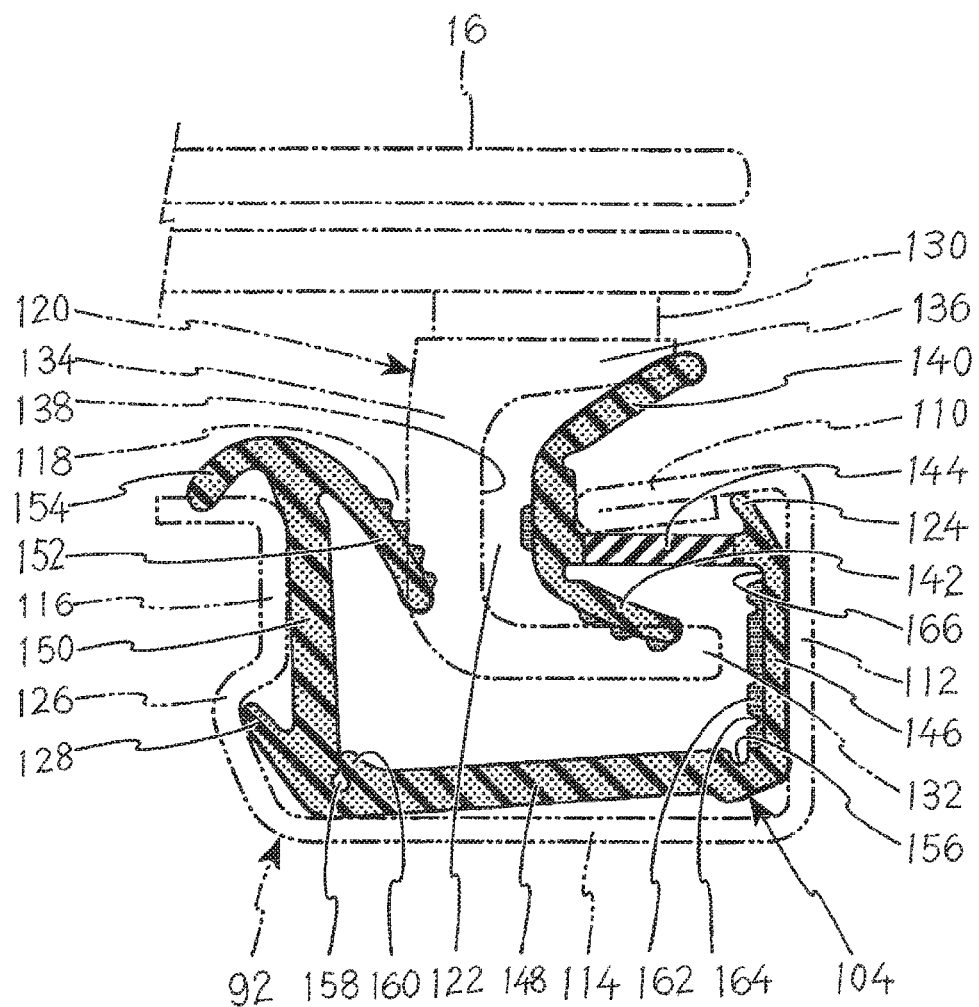
FIG. 5 is a cross-sectional view of a glass run in an embodiment of the present invention, which is attached to a lower channel, taken along line A-A of FIG. 2.

As shown in FIG. 5, the lower channel 92 includes a first wall 110, a second wall 112, a third wall 114 and a fourth wall 116, each having a plate-shaped configuration, and has a generally rectangular cross section. With this arrangement, these four walls can hold the rear lower glass run 104 having later-described four side walls so that when the door glass 16 is raised or lowered, or vibrates, the door glass 16 can be securely held with the rear lower glass run 104 for attachment within the lower channel 92.

The first wall 110 of the lower channel 92 is formed shorter than the facing third wall 114 to define an opening part 118 between a tip end of the first wall 110 and a tip end of the fourth wall 116. A later-described glass slider 120 is inserted from the opening part 118, and a later-described opening part 122 of the rear lower glass run 104 is held with the opening part 118 of the lower channel 92 to prevent deformations of the opening part 122 when the glass slider 120 slides along the opening part 122.

The tip end of the first wall 110 of the lower channel 92 is bent inwardly like a hair pin, and the resulting bent tip end of the first wall 110 defines a step, and is engaged with a later-described holding lip 124 of a first side wall 144 of the rear lower glass run 104. A bending part 126 is provided in about a center of the fourth wall 116 of the lower channel 92, and is engaged with a holding lip 128 of a fourth side wall 150 of the rear lower glass run 104.

As shown in FIG. 5, the glass slider 120 is attached to a tip end of each vertical side portion of a front side edge and a rear side edge of the door glass 16. The glass slider 120 is bonded by an adhesive layer 130 in the area from an upper end of the tip end of each vertical side portion of the front side edge and the rear side edge of the door glass 16 to the position below the belt line. The glass slider 120 is formed to have a U-shaped cross section, and a tip end thereof defines a glass slider end part 132. The glass slider 120 bends nearly perpendicularly from the glass slider end part 132 to define a glass slider main part 134, and bends nearly perpendicularly from the glass slider main part 134 to define a glass slider attaching part 136.

A space surrounded by the glass slider end part 132, the glass slider main part 134, and the glass slider attaching part 136 defines a glass slider recessed part 138. Later-described first seal lip 140 and second seal lip 142 of the rear lower glass run 104 are inserted in the glass slider recessed part 138.

When the door glass 16 is lowered, the glass slider attaching part 136 is bonded to a surface of the tip end of door glass 16, which faces the lower channel 92, below the belt line 38 by the adhesive layer 130. The glass slider end part 132 continuing with the glass slider main part 134 via the opening part 122 is located within the rear lower glass run 104, thereby holding the glass slider 120 with the rear lower glass run 104. The glass slider 120 can be composed of a hard synthetic resin or a metal such as aluminum.

Hereinafter, the rear lower glass run 104 will be explained with reference to FIG. 5.

The rear lower glass run 104 is attached to the lower channel 92 below the belt line 38 of the automobile door 14 to guide the door glass 16 as it is raised and lowered. The rear lower glass run 104 has a first side wall 144, a second side wall 146, a third side wall 148 and a fourth side wall 150, which are formed into a generally rectangular cross section.

The opening part 122 is defined between a tip end of the first side wall 144 and a tip end of the fourth side wall 150.

The first side wall 144, the second side wall 146, the third side wall 148 and the fourth side wall 150 are respectively formed to have a plate-shaped configuration. At least one part of the first side wall 144, the second side wall 146, the third side wall 148 and the fourth side wall 150 is composed of a material with rigidity higher than those of remaining parts of the side walls. In the embodiment shown in FIG. 5, the first side wall 144 is composed of a material with higher rigidity.

The second side wall 146, the third side wall 148 or the fourth side wall 150 may be composed of a material with higher rigidity in place of the first side wall 144. In addition, either of connection parts between the first side wall 144, and the second side wall 146, between the second side wall 146 and the third side wall 148, and between the third side wall 148 and the fourth side wall 150 may be composed of a material with higher rigidity.

The rear lower glass run 104 inclusive of the parts composed of the material with higher rigidity and the remaining parts is formed of a synthetic rubber or a thermoplastic elastomer (TPV), and examples of the synthetic rubber include EPDM rubber, whereas examples of the thermoplastic elastomer (TPV) include polyolefin elastomer, etc.

It is preferable that the material with higher rigidity exhibits an HDD hardness ranging from 30 to 80. In this case, when the rear lower glass run 104 is inserted from a longitudinal end of the lower channel 92, the rigidity of the rear lower glass run 104 can be kept to prevent deformations thereof so that the insertion workability can be improved. When the HDD hardness is less than 30, the rigidity of the rear lower glass run 104 cannot be kept so that the insertion workability is lowered, whereas when the HDD hardness exceeds 80, the rigidity of the rear lower glass run 104 becomes too great so that an insertion load increases upon inserting of the rear lower glass run 104 into the lower channel 92.

The first seal lip 140 is formed to extend from the tip end of the first side wall 144 obliquely outwardly of the first side wall 144 toward the second side wall 146 (in the obliquely upper right direction in FIG. 5). And the second seal lip 142 is formed to extend from the tip end of the first side wall 144 obliquely inwardly of the first side wall 144 toward the second side wall 146 (in the obliquely lower right direction in FIG. 5). When the rear lower glass run 104 is held with the lower channel 92, and the glass slider 120 is held with the rear lower glass run 104, the first seal lip 140 and the second seal lip 142 contact interior surfaces of the glass slider recessed part 138.

A third seal lip 152 is formed to extend from the tip end of the fourth side wall 150 obliquely inwardly of the fourth side wall 150 toward the third side wall 148 (in the obliquely lower right direction in FIG. 5). When the glass slider 120 is held with the rear lower glass run 104, the third seal lip 152 contacts a surface of the glass slider main part 134, which faces the fourth side wall 150 (on the opposite side of the glass slider recessed part 138).

A fourth seal lip 154 is formed to extend from the tip end of the fourth side wall 150 obliquely outwardly of the fourth side wall 150 toward the third side wall 148 (in the obliquely lower left direction in FIG. 5). The fourth seal lip 154 contacts a bent tip end of the fourth wall 116 of the lower channel 92 to provide a seal between the lower channel 92 and the rear lower glass run 104.

A recess 156 is formed in an interior surface of the connection part between the second side wall 146 and the third side wall 148, and a recess 158 is formed in an interior surface of the connection part between the third side wall 148 and the fourth side wall 150. With this arrangement, the second side wall 146 and the fourth side wall 150 can flexibly bend against the third side wall 148.

A holding lip 160 is formed to extend from the third side wall 148 in the vicinity of the recess 158 toward a root of the fourth side wall 150. The holding lip 160 contacts the fourth side wall 150 to prevent the fourth side wall 150 from excessively bending.

Sliding layers 162 and grooves 164 are provided in an interior surface of the second side wall 146 so that the tip end 132 of the glass slider 120 can slide smoothly when contacting the interior surface of the second side wall 146. In addition, sliding layers are also formed in surfaces of the first seal lip 140, the second seal lip 142 and the third seal lip 152 so that the glass slider 120 can slide thereon smoothly.

In addition, a recess 166 is formed in an interior surface of the connection part between the first side wall 144 and the second side wall 146 so that the first side wall 144 and the second side wall 146 can flexibly bend.

The holding lip 124 is formed in an exterior surface in the vicinity of the connection part between the first side wall 144 and the second side wall 146, and, as described above, it is engaged with the tip end of the first wall 110 of the lower channel 92, which is bent like a hair pin, to hold the rear lower glass run 104.

The holding lip 128 is formed in an exterior surface in the vicinity of the connection part between the fourth side wall 150 and the third side wall 148, and, as described above, it is engaged with the bending part 126 of the fourth wall 116 of the lower channel 92 to hold the rear lower glass run 104.

Hereinafter, the attachment of the rear lower glass run 104 to the lower channel 92 along with the holding of the glass slider 120 with the rear lower glass run 104 will be explained with reference to FIG. 5.

The rear lower glass run 104 and the lower channel 92 are respectively formed into a generally rectangular cross section so that the attachment of the rear lower glass run 104 to the lower channel 92 is performed by inserting a tip end of the rear lower glass run 104 from a longitudinal end of the lower channel 92 in the longitudinal direction thereof.

Since the opening part 122 is formed between the tip end of the first side wall 144 and the tip end of the fourth side wall 150 of the rear lower glass run 104, the glass slider end part 132 is located in the main body of the rear lower glass run 104, whereas the glass slider main part 134 is located in the opening part 122 so that the glass slider 120 can be held, the door glass 16 can be guided as it is raised and lowered, and a seal between the glass slider 120 and the rear lower glass run 104 can be provided.

When the rear lower glass run 104 is attached to the lower channel 92, the first seal lip 140 and the second seal lip 142 contact the glass slider recessed part 138 so that the position of the glass slider 120 becomes stable, and the glass slider 120 and the door glass 16 can be smoothly guided as it is raised and lowered. When the first seal lip 140 and the second seal lip 142 contact the glass slider recessed part 138, they can flexibly bend to provide a seal against the glass slider 120.

The third seal lip 152 contacts a surface of the glass slider main part 134, which faces the fourth side wall 150. With this arrangement, the third seal lip 152 can prevent the movement of the glass slider 120 toward the fourth side wall 150, and improve the sealing properties between the rear lower glass run 104 and the glass slider 120.

As described above, either part of the four side walls of the rear lower glass run 104 is composed of a material with higher rigidity so that the rear lower glass run 104 can be smoothly inserted without any deformation thereof.

Where the first side wall 144 is composed of the material with rigidity higher than those of remaining parts of the side walls, upon inserting of the rear lower glass run 104 from the tip end of the lower channel 92, deformations of the rear lower glass run 104 can be prevented to improve the insertion workability, and the first seal lip 140 and the second seal lip 142 contact the glass slider recessed part 138 so that the sealing properties between the glass slider 120 and the rear lower glass run 104 can be improved.

Where the third side wall 148 of the rear lower glass run 104 is composed of the material with rigidity higher than those of remaining parts of the side walls, upon inserting of the rear lower glass run 104 from the tip end of the lower channel 92, deformations of the third side wall 148 located in a central part of the rear lower glass run 104 can be prevented, thereby preventing deformations of an entire part of the rear lower glass run 104 and improving the insertion workability.

Where the connection part between the first side wall 144 and the second side wall 146 of the rear lower glass run 104 is composed of the material with rigidity higher than those of remaining parts of the side walls, upon inserting of the rear lower glass run 104 from the tip end of the lower channel 92, deformations of the rear lower glass run 104 can be prevented to improve the insertion workability, thereby preventing deformations of the first side wall 144 and the second side wall 146. As a result, the first seal lip 140 and the second seal lip 142 securely contact the glass slider recessed part 138 of the glass slider 120 to guide the glass slider 120 with the rear lower glass run 104, and improve the sealing properties between the glass slider 120 and the rear lower glass run 104.

Upon producing of the rear lower glass run 104, the connection part between the second side wall 146 and the third side wall 148 is formed open to define an obtuse angle, and the connection part between the third side wall 148 and the fourth side wall 150 is formed open to define an obtuse angle. With this arrangement, the first seal lip 140 and the second seal lip 142 of the first side wall 144 can be prevented from contacting the third seal lip 152 of the fourth side wall 150 upon extruding of the rear lower glass run 104.

When the rear lower glass run 104 is inserted into the lower channel 92, the connection parts, each having an obtuse angle, are narrowed to confirm to the configuration of the lower channel 92. At this time, the recess 156 of the connection part between the second side wall 146 and the third side wall 148 along with the recess 158 of the connection part between the third side wall 148 and the fourth side wall 150 readily bend, whereby the above-described connection parts can be readily narrowed to improve the insertion workability.

In the present embodiment, the rear lower glass run 104 has been explained, but, the present invention can be also applied to the front lower glass run 106.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A holding structure of a glass run for an automobile, which is adapted to be attached to a lower channel provided below a belt line of an automobile door for guiding a door glass as the door glass is raised and lowered,
   wherein the glass run includes a first side wall, a second side wall, a third side wall and a fourth side wall, and has a generally rectangular cross section, the first side wall, the second side wall, the third side wall and the fourth side wall are respectively formed to have a plate-shaped configuration, and at least one part of the first side wall, the second side wall, the third side wall and the fourth side wall is composed of a material with rigidity higher than those of remaining parts of the side walls,
   an opening part is defined between a tip end of the first side wall and a tip end of the fourth side wall,
   the lower channel includes a first wall, a second wall, a third wall and a fourth wall, and has a generally rectangular cross section,
   an opening part of the lower channel is defined between a tip end of the first wall and the fourth wall of the lower channel,
   a glass slider that includes a main part, and a tip end part that is located within the glass run, the tip end part being continuous with the main part through the opening part of the glass run,
   the first side wall, the second side wall, the third side wall and the fourth side wall of the glass run are held with the first wall, the second wall, the third wall and the fourth wall of the lower channel, and
   a first seal lip is formed to extend from the tip end of the first side wall obliquely outwardly of the first side wall toward the second side wall, whereas a second seal lip is formed to extend from the tip end of the first side wall obliquely inwardly of the first side wall toward the second side wall, and the glass slider has a U-shaped cross section, which defines a glass slider recessed part on a side facing the tip end of the first side wall such that the first seal lip and the second seal lip contact the glass slider recessed part to guide the glass slider.

2. The holding structure as claimed in claim 1, wherein the first side wall of the glass run is composed of a material with rigidity higher than those of remaining parts of the side walls.

3. The holding structure as claimed in claim 1, wherein the third side wall of the glass run is composed of a material with rigidity higher than those of remaining parts of the side walls.

4. The holding structure as claimed in claim 1, wherein a connection part between the first side wall and the second side wall of the glass run is composed of a material with rigidity higher than those of remaining parts of the side walls.

5. The holding structure as claimed in claim 1, wherein a recess is defined in an interior surface of each of a connection part between the second side wall and the third side wall and a connection part between the third side wall and the fourth side wall of the glass run.

6. The holding structure as claimed in claim 1, wherein a third seal lip is formed to extend from the tip end of the fourth side wall obliquely inwardly of the fourth side wall toward the third side wall to locate the tip end part of the glass slider within the glass run, and hold the glass slider such that the third seal lip contacts a surface of the glass slider, which faces the fourth side wall.

7. The holding structure as claimed in claim 1, wherein the material with higher rigidity exhibits a durometer hardness D (HDD) ranging from 30 to 80.

\* \* \* \* \*